INVENTORS: J. R. HAYNES
W. SHOCKLEY
BY [signature]
ATTORNEY

INVENTORS: J. R. HAYNES
W. SHOCKLEY
BY
[signature]
ATTORNEY

Patented June 17, 1952 2,600,500

UNITED STATES PATENT OFFICE 2,600,500

SEMICONDUCTOR SIGNAL TRANSLATING DEVICE WITH CONTROLLED CARRIER TRANSIT TIMES

James R. Haynes, Chatham, and William Shockley, Madison, N. J., assignors to Bell Telephone Laboratories, Incorporated, New York, N. Y., a corporation of New York Application September 24, 1948, Serial No. 50,894

25 Claims. (Cl. 179—171)

This invention relates to signal translating devices and more particularly to circuit elements and circuits of the general type disclosed in the applications Serial No. 33,466, filed June 17, 1948, of J. Bardeen and W. H. Brattain, now Patent 2,524,035, granted October 3, 1950, Serial No. 35,423, filed June 26, 1948, of W. Shockley, now Patent 2,569,347, granted September 25, 1951, and Serial No. 50,897, filed September 24, 1948, of G. L. Pearson and W. Shockley, now Patent 2,502,479, granted April 4, 1950.

Understanding of the invention may be facilitated and the description hereinafter simplified by preliminary consideration or review of salient facts and principles and explanation of terms. The devices of this invention utilize semiconductors. As is now known, such semiconductors are of two conductivity types, specifically N type which passes current easily when the material is negative with respect to a conductive connection thereto, and P type which passes current easily when the material is positive with respect to such connection. The direction of current flow is conventional, that is, opposite to that of the electron flow. The conductivity type is determined, in one way, by the nature of minute quantities of impurities in the basic material.

Two semiconductive materials suitable for use in devices constructed in accordance with this invention are germanium and silicon each of either conductivity type. Typical germanium materials and methods of making them are disclosed in the application Serial No. 638,351, filed December 29, 1945, of J. H. Scaff and H. C. Theuerer; typical silicon materials are disclosed in Patents 2,402,661 and 2,402,662 granted to R. S. Ohl and in the application Serial No. 793,744, filed December 24, 1947, of J. H. Scaff and H. C. Theuerer. A method of making filaments or thin films of these materials, the filament or film being of one conductivity type throughout or having zones of different conductivity types, is disclosed in the application Serial No. 50,896 filed September 24, 1948, of G. L. Pearson, now Patent 2,560,594, granted July 17, 1951.

In semiconductive body type translating devices, the electrical currents, according to presently accepted theory, are carried by electrons. Also, according to the accepted theory, the current may be carried by the electrons in two distinct ways; one being referred to as conduction by electrons, designated as the excess process, and the other as conduction by holes, termed the defect process. According to the theory a hole may be viewed as a carrier of a positive electric charge, analogous to the usual consideration of an electron as a carrier of a negative charge.

Circuit elements of the type disclosed in the above-identified applications comprise, in general, a body of semiconductive material, a pair of connections to spaced regions of the body, and a third connection to another region of the body. An input circuit is connected between one of the pair of connections, designated the emitter, and the third connection, designated the base; an output circuit is connected between the other of the pair of connections, designated the collector, and the base. In one embodiment, wherein the body is of N type material, the emitter may be biased positive relative to the base and the collector may be biased negative to the base. As disclosed in the applications noted, such elements are suitable for a variety of uses, e. g. as amplifiers, modulators and oscillators.

In such devices, as disclosed in the applications above identified, modulation of the collector current may be effected by modifying the properties of the body of the semiconductive material in the vicinity of a rectifying contact or connection to the body. Specifically, this is accomplished by injecting carriers of electric charges of the sign or polarity not normally present in the semiconductive body, through the rectifying contact or connection. The latter may be obtained in several ways, for example by use of a metal point engaging the body, by employing a member or body of semiconductive material of conductivity type opposite that of the first body, in engagement therewith, or by treating portions of the main semiconductive body to produce contiguous areas or regions of opposite conductivity type. In the last two cases mentioned, a rectifying junction or barrier is produced between the bodies or portions of opposite conductivity types.

If the main body is of N type material, holes are injected into the body by current flowing in the forward or easy flow direction at the emitter. These holes migrate due to diffusion and the fields produced by the emitter and collector currents. As a result, a substantial fraction of the holes flow to the region of the collector thereby to aid the emission of electrons at the collector, whereby current multiplications are produced and current gains are realized.

Inasmuch as the collector is operated in the reverse direction, the collector impedance is very high relative to the emitter impedance. Consequently, even aside from the matter of current multiplication, power gains are attainable substantially in the ratio of the output to input impedances.

One general object of this invention is to improve circuit elements, and circuits including such elements, of the general type above described. More specific objects of this invention are to:

Control the transit time of charge transfer or hole flow through the semiconductive body;

Decrease the transit time, whereby an increase in the operating frequency range of the circuit element and circuits is realized;

Enable the storage or delayed transmission of electrical signals;

Improve circuits and circuit elements for the translation or delayed transmission of electrical signals;

Enhance the fidelity of translation or transmission of electrical signals by semiconductive devices of the general type above described;

Simplify such devices;

Facilitate the attainment of a prescribed delay time in the transmission of electrical signals;

Enable accurate and easily realizable variation in such delay time;

Increase the rectilinearity of charge or hole flow in signal translating devices of the semiconductor type; and Improve the field distribution in the body of such device.

In accordance with one broad feature of this invention, in a translating device including a semiconductive body and an emitter and a collector associated therewith, means are provided for controlling the time interval between the application of a signal to the emitter and the appearance of a replica of the signal at the collector.

In accordance with a more specific feature of this invention, in such a translating device means are provided for establishing in the semiconductive body and between the emitter and collector regions an electric field of the polarity to accelerate the transfer of charge or flow of holes from the emitter region to that of the collector.

In accordance with another feature of this invention, the semiconductive body and the connections thereto are constructed and arranged so that a highly uniform control or accelerating field is established in the body, between the emitter and collector regions.

In accordance with a further feature of this invention, the body and the connections thereto, including the accelerating field producing connections and source, are correlated to produce a prescribed time delay between the application of input signals to the emitter and the appearance of corresponding output signals in the collector circuit.

It has been discovered that the flow or migration of holes in a semiconductor is characterized by a definite velocity, that the holes have a finite life, and that the velocity and hole life are of such magnitudes that they can be utilized to attain a number of useful results. For example, the transit time of the holes from the emitter to the collector region in an amplifier device of the general type described hereinabove enters into the determination of the upper frequency limit of operation. In one aspect, this invention enables control of such transit time. Specifically, in one embodiment, it enables reduction of transit time whereby the operating frequency range is extended. In another embodiment, control of the motion of holes enables use of semiconductor type devices for delay or storage of electrical signals. Both amplification and delay may be obtained concomitantly. Also, the delay may be varied in a desired manner, for example to produce phase modulation. Other applications will be discussed hereinafter.

The invention and the above-noted and other features thereof will be understood more clearly and fully from the following detailed description with reference to the accompanying drawing, in which:

Fig. 1 is a diagram illustrating the principal elements and the association thereof in a signal translating device constructed in accordance with this invention;

Figs. 2 to 6A, inclusive, show several forms and constructions of semiconductive bodies and the connections thereto in illustrative embodiments of this invention;

Figures 1, 2, 3, 4, 5, 6, 7, 8, 9:
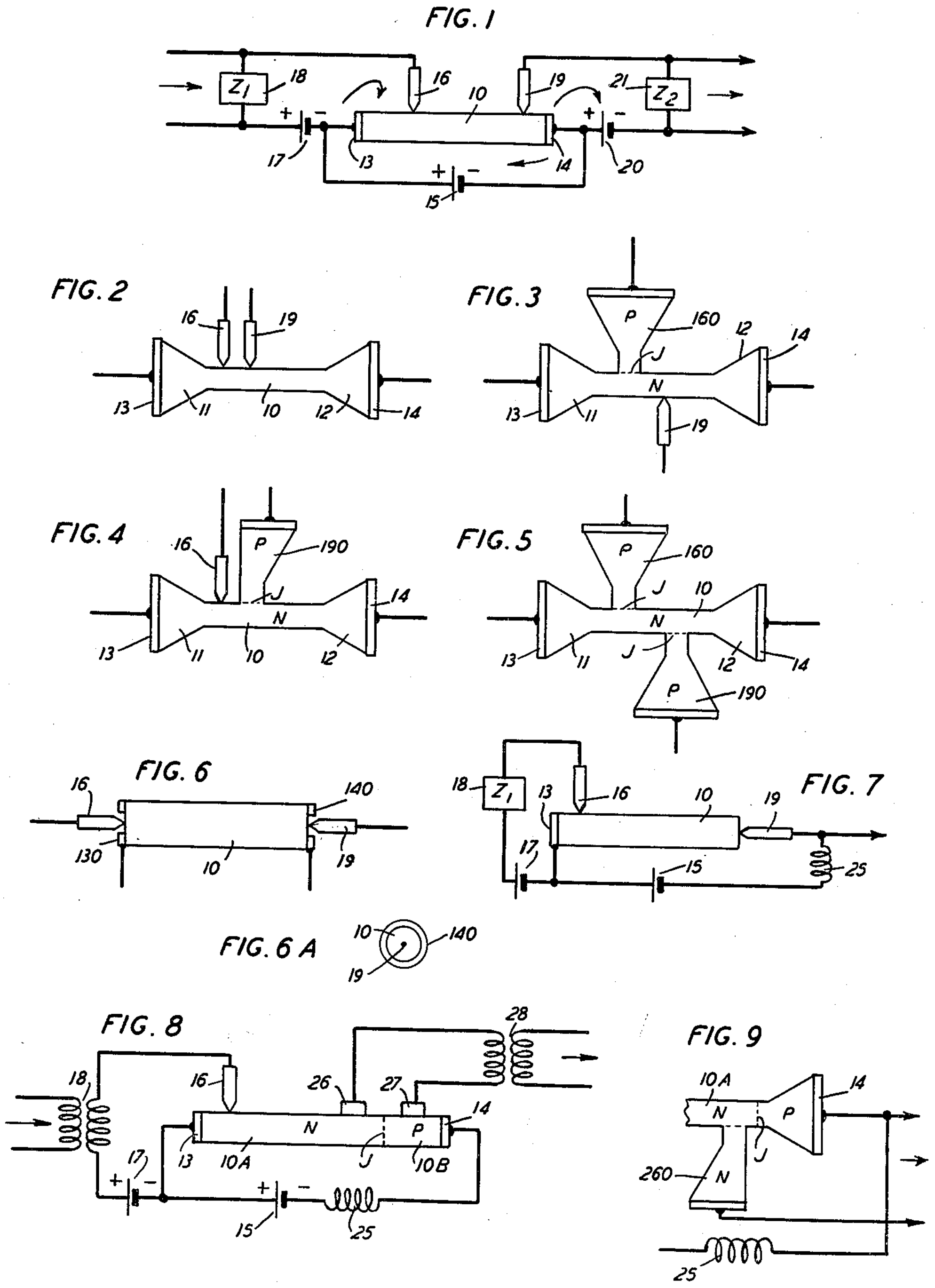
Fig. 7 is a diagram illustrating a modification of the device shown in Fig. 1.
Fig. 8 is a diagram illustrating another embodiment of the invention wherein the semiconductive body comprises zones of different conductivity types.
Fig. 9 is a fragmentary view showing a modification of the semiconductive body in the organization illustrated in Fig. 8.

It is noted that in the drawing, in the interest of clarity, the semiconductive bodies are shown to a greatly enlarged scale. The magnitude of the enlargement will be appreciated from the dimensions for typical devices given hereinafter.

Referring now to the drawing, Fig. 1 shows, in somewhat diagrammatic form, a basic combination which may be used for a variety of purposes such as amplification or storage of signals. The translating device illustrated in Fig. 1 comprises a body 10 of semiconductive material of one conductivity type throughout and having low resistance ohmic connections or terminals 13 and 14 at its opposite ends. These connections may be, for example, coatings, such as of rhodium, electroplated upon the body to form nonrectifying junctions therewith. Connected directly between the terminals 13 and 14 is a direct current source 15, such as a battery, for producing a biasing field threading the body 10 longitudinally. A contact point 16, for example of tungsten or Phosphor bronze, engages the body 10, as near one end thereof, and is connected to the terminal 13 through a biasing source 17 and an impedance 18, which may be resistive or inductive. A second contact point 19, also, for example of tungsten or Phosphor bronze, engages the body 10 at a region removed from the contact 16, as adjacent the other end of the body, and is connected to the terminal 14 through a biasing source 20 and an impedance 21, which, like the impedance 18, may be resistive or inductive.

If the body 10 is of N type material, for example of high back voltage N type germanium, the polarities of the sources 15, 17 and 20 are as shown in Fig. 1 and the contact 16 is the emitter, the contact 19 is the collector and the terminal 13 is the base. Specifically, the terminal 13 is connected to the positive side of the source 15, the emitter 16 is biased sufficiently positive with respect to the terminal 13 so that a positive current flows from the emitter 16 into the body 10, and the collector 19 is biased negatively with respect to the terminal 14. The direction of current flow in the external circuits is as shown by the arrows in the emitter and collector circuits in Fig. 1. If the body 10 is of P type material, the polarities of the sources 15, 17 and 20 should be reversed. In general, the bias upon the emitter 16 should be small, for example of the order of 0.1 volt, and the bias upon the collector 19 should be relatively large, for example of the order of 10 to 100 volts.

As has been pointed out heretofore, if the body 10 is of N type material, holes are injected into the body at the emitter 16 and flow toward the collector 19 thereby to effect modulation of the collector current. The transit time of the holes from emitter to collector is a function of the distance between the emitter and collector and also of the biasing or accelerating field due to the source 15. The relationship involved will be discussed hereinafter.

In devices used as alternating current amplifiers, it is desirable that this transit time be small inasmuch as it limits the upper frequency at which gain can be obtained. By spacing the collector and emitter closely, a relatively small transit time is obtained. For any spacing, a reduction in transit time is realized due to the acceleration of the holes because of the source 15. In an illustrative device, the collector to emitter spacing may be 0.002 inch and the source voltage may be 10 volts.

In order that the field to which the holes are subjected be high, the major portion of the semiconductive body is made to have very small cross-sectional dimensions. In one form, illustrated in Fig. 2, the semiconductive body comprises a filamentary portion 10, 0.005 inch by 0.005 inch in cross section, of the order of one inch long, and integral enlarged end portions 11 and 12 which may be of the same or greater thickness than the portion 10 and to which the ohmic terminals 13 and 14 are applied. The emitter and collector points 16 and 19 engage the filamentary portion 10 and may be spaced of the order of 0.002 inch in a typical device.

The rectifying junction between the emitter and the body 10 may be obtained also by the use of an emitter of the same material as the body but of opposite conductivity type. For example, as illustrated in Fig. 3, the body 10, 11, 12 may be of N type germanium and the emitter 160 may be an integral wing or extension on the body but of P type. Methods of making the body and emitter of different conductivity types are disclosed in the application of G. L. Pearson referred to hereinabove. The rectifying junction obtains at the meeting portions of the filamentary body 10 and the wing or extension 160.

Similarly, a rectifying junction between the collector and the body may be obtained, as illustrated in Fig. 4, by forming an integral wing or extension 190 of the body of P type material.

Also, both the emitter and collector may be constituted by integral wings 160 and 190 respectively on the filament 10 as illustrated in Fig. 5, these wings being of P type material and the portions 10, 11, 12 being of N type material.

In the embodiments illustrated in Figs. 3, 4 and 5 it will be understood that ohmic low resistance connections are made to the wings or extensions as by electroplated coatings similar to the terminals 13 and 14.

In devices of the constructions illustrated in Figs. 3, 4 and 5 and intended for use as alternating current amplifiers, the dimensions and source voltages may be of the order of the values given heretofore in the discussion of Figs. 1 and 2.

It will be appreciated that a prescribed delay between the application of an input signal at the emitter and the appearance of a replica thereof at the collector may be attained by correlation of the distance between the emitter and collector and the voltage of the source 15. For example, the spacing between emitter and collector may be increased so that the hole transit time results in the desired delay. Several factors are to be borne in mind, however, in connection with the attainment of delay by operating upon the emitter to collector distance.

One factor is that the field which accelerates the holes should be substantially uniform and the paths of the holes should be substantially rectilinear so that a uniform delay with little dispersion of transit time is produced. The use of a thin or filamentary body of semiconductor leads to realization of these desiderata. Other ways in which uniformity of field and rectilinearity of hole flow can be obtained or enhanced will be discussed presently.

A second factor is that recombination of holes and electrons occurs in the semiconductive body, so that the hole current decreases with time. Specifically, if the average hole life is $\tau$, the fraction of holes injected at the emitter at time $t=0$ which are uncombined at any time $t$ decreases exponentially according to $$\left(-\frac{t}{\tau}\right)$$

Hence, in any particular device, the direct current bias due to the source 15, and the spacing between emitter and collector should be such that the maximum attenuation of hole current does not reduce the collector current below a prescribed desired value.

For high back voltage N-type germanium, the average hole life is several microseconds.

A third factor of moment, particularly in cases where substantial attenuation of the hole current obtains, involves the nature of the current variations obtained in the output circuit. The process of modulation of the collector current by the emission or injection of holes at the emitter is to be distinguished from ohmic effects due to changes in total current in the semiconductive body. The total current, of course, is conserved in the sense of Kirchoff's laws, except for charging of the small stray capacitances in the device. Hence, the total current in the body 10 is the same at all points between 16 and 19. It is equal to the sum of the currents in electrodes 13 and 16 and also to the sum of the currents in the electrodes 14 and 19. Thus, if the current at the emitter 16 is modulated so as to produce a change in the current in the body 10, this change will be transmitted to the end of the body at which the electrodes 14 and 19 are located with a velocity substantially equal to that of light.

However, the holes injected at the emitter and flowing toward the collector have a definite velocity, as pointed out heretofore, and some delay occurs between the injection of the holes and the modulation thereby of the collector current.

Consequently, the output signal comprises two components, one associated with the voltage drop between the electrodes 14 and 19 and appearing substantially instantaneously with the application of the input signal and the other associated with the modulation of the collector current by the holes and delayed with respect to the input signal. If desired, discrimination between these two components may be effected. If the attenuation of the holes, as discussed above, is small, the delayed signal component will be amplified so that it is much larger than the direct signal. The two components may then be distinguished on an amplitude basis, e. g. only the delayed component may be passed to the load by the provision of an amplitude limiter in the output circuit. If the attenuation of the holes and, hence, of the delayed signal component is too large, the direct signal component may be balanced out in the output circuit. Several specific ways in which this may be accomplished will be described hereinafter.

Figure 10:
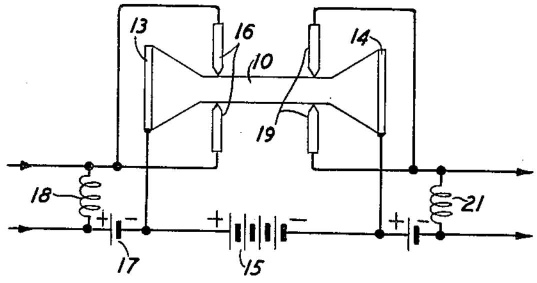
Fig. 10 is a diagram showing the basic components and the association thereof in a delay or storage device constructed in accordance with this invention.

One construction and the general organization of elements in a device suitable for use for the delay or storage of electrical signals is illustrated in Fig. 10. In this figure, the semi-conductive body is of the form illustrated in Fig. 2 and described heretofore; that is, it comprises an intermediate portion 10 of small transverse dimensions, for example 0.005 inch by 0.005 inch, and enlarged end portions 11 and 12. It may be of one conductivity type, for example of high back voltage N type germanium, throughout. For this material, the polarities of the sources 15, 17 and 20 are as indicated and the emitter and collector biases may be of the order of magnitude heretofore indicated in the description of Fig. 1. Of course, if the body is of P type material, the polarities of the sources should be reversed.

The input and output impedances 18 and 21 may be choke coils as illustrated, which permit passage of direct current but present a high impedance to alternating current signals.

Because of the small cross-sectional dimensions of the body portion 10, a highly uniform biasing field obtains and the flow of holes is substantially rectilinear, longitudinally of the body, from the emitter region to that of the collector. Rectilinearity of hole flow is enhanced by the use of two aligned juxtaposed emitters, as shown in Fig. 10, so that the holes injected at each emitter do not pass beyond the longitudinal axis of the body inasmuch as they encounter an opposing or compensating flow from the other emitter.

As in the other devices heretofore described, holes injected at the emitters 16 flow to the collectors and modulate the collector current. If the hole current is small in comparison to the direct or biasing current due to the source 15 and the distance between the emitter and collector regions is small in comparison to the hole life, substantially all of the injected holes will flow to the collector region. Also, if the hole current is small, the conductivity of the semiconductive body will not be altered appreciably so that the holes flow in a substantially uniform field and there will be no dispersion in transit time except that due to normal diffusion of the holes. Thus, it will be appreciated, an input pulse applied to the emitters results in a group or pulse of holes which may be viewed as moving from the emitters to the collector region with a finite velocity. The resultant output pulse is a delayed replica of the input pulse. Successive input pulses produce successive groups or pulses of holes which move toward the collector region in physical and time spaced relation. Hence, in effect, a number of pulses may be stored along the body 10.

The number of distinguishable pulses which can be thus stored along the semiconductive body will be dependent upon a number of parameters the relation of which is determinable as will appear presently. It is noted that during the transit of a hole group or pulse along the body, the group or pulse tends to spread out, the degree of spreading being closely represented by the diffusion length. A hole pulse initially of square form will, during its transit along the body, assume a generally triangular form. Successive pulses of equal initial amplitudes may be readily distinguished if, after the pulses have thus spread out, the amplitude of one pulse at the point corresponding to the center of the next succeeding pulse is substantially one half the peak pulse amplitude. As a general rule, then, successive pulses can be distinguished if the interval between pulses is greater than the diffusion length.

The transit time between the emitters 16 and collectors 19 is given by the relation $$t=\frac{L}{\text{drift velocity}}=\frac{L}{\frac{\mu V}{L}}=L^2/\mu V \qquad (1)$$

where $t$ is the transit time,

L is the distance between the emitters and collectors,

V is the biasing voltage between the emitters and collectors, and $\mu$ is a constant dependent upon the particular semiconductive material. For germanium, $\mu=1000$ cm$^2$/volt sec. for holes and 1500 cm$^2$/volt sec. for electrons. For silicon, the values are 300 and 100 cm$^2$/volt sec. respectively.

The diffusion length, $l$, is given by the relation $$l=2\sqrt{Dt}=2\sqrt{\frac{\mu}{40}t} \qquad (2)$$

According to the Einstein equation, $$D=\frac{kT\mu}{e}\text{ cm.}^2\text{/sec.} \qquad (3)$$

where $k$ is a constant

T is temperature in degrees K. and $e$ is the charge of the electron.

At 300 degrees K., $$D=\mu x\frac{1}{40}\text{ volt}$$

The number of distinguishable pulses or hole groups which can be stored in the semiconductive body is $$\frac{L}{l}=\sqrt{\mu Vt/\left(\frac{\mu}{10}\right)t}=\sqrt{10V} \qquad (4)$$

The maximum useful time delay which can be produced, and, therefore, the number of pulses which can be stored, is limited by the recombination of holes with electrons in the body. As has been pointed out heretofore, the concentration of holes in a pulse traversing the semiconductive body decreases exponentially according to $$\left(-\frac{t}{\tau}\right)$$

The signals and gains will be reduced proportionately. It is evident that if $t$ is large, the pulse signal at the collector may become so small that it cannot be detected readily. However, inasmuch as the device produces amplification of the input signal, substantial attenuation of the hole pulse can be tolerated. Specifically, an attenuation of about 40 decibles appears to be permissible. Attenuation of this magnitude corresponds to about 4.6 hole lifetimes in high back voltage N type germanium.

As an example, if it is desired to store 40 distinguishable pulses along the portion 10 of the semiconductive body in a device of the construction illustrated in Fig. 10, the body being of high back voltage germanium, the requisite voltage between the emitters and collectors is 160 volts according to Equation 4. If each pulse is of $\frac{1}{10}$ microsecond duration, the total transit time is 4 microseconds or less than 4.6 hole lifetimes. From Equation 1, then, the required length, i. e., the distance between emitters and collectors is 0.8 centimeter.

If the input pulses are of relatively large amplitudes whereby the concentration of holes injected is sufficient to affect the conductivity of the semiconductive body appreciably, appropriate allowance must be made in the determination of the length L and voltage V. In general, if the conductivity is thus affected, the velocity of flow of pulses through the body is decreased. Thus, to compensate for this effect to obtain a desired delay or number of stored pulses, the length L should be decreased or the voltage V increased.

Figure 11A:
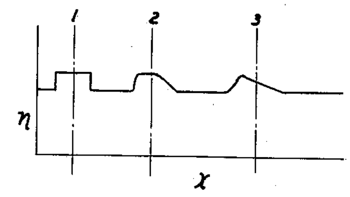
Figs. 11A and 11B are diagrams illustrating certain relationships of electrons and holes in translating devices such as that shown in Fig. 10.
Figure 11B:
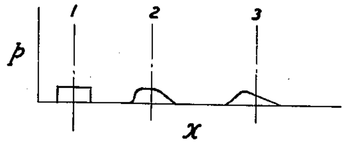

The effect of changes in conductivity is illustrated in Figs. 11A and 11B. In both figures, the abscissae $x$ are distance along the semiconductive body and the motion of pulses is considered as from left to right. In Fig. 11A, the ordinates $n$ represent the concentration of electrons; in Fig. 11B the ordinates $p$ represent the concentration of holes. As indicated in Fig. 11A, there is a certain constant component of electron concentration corresponding to the normal conductivity of the semiconductor in the absence of hole injection. Where holes are added, they are substantially compensated for by an equal increase of electronic space charge.

Assume, for purposes of discussion, that a square-topped pulse is impressed upon the input circuit. Then at the emitters 16 the electron and hole concentration is as indicated at 1 in Figs. 11A and 11B. As the pulse moves along the semiconductive body toward the collectors 19 the holes tend to diffuse and the pulse lengthens. Holes which diffuse to the forward end of the pulse enter into a region of normal conductivity and, hence, encounter a stronger field than those toward the center of the pulse. Consequently, the leading edge of the pulse tends to be drawn out. On the other hand, holes which fall behind the center of the pulse are in a region of higher field than those toward the center of the pulse. Consequently they tend to catch up so that the trailing edge of the pulse will be sharper than the leading edge. Because of the action noted, the pulse form changes, as indicated at 2 and 3 in Figs. 11A and 11B, as the pulse moves along the body. This feature may be utilized to distinguish between pulses, with closer tolerances than those assumed in connection with the equations presented hereinabove, by using circuits in the output amplifier which have a frequency response peaked at the frequencies involved in the sharp trailing edge of the pulse.

Figure 12:
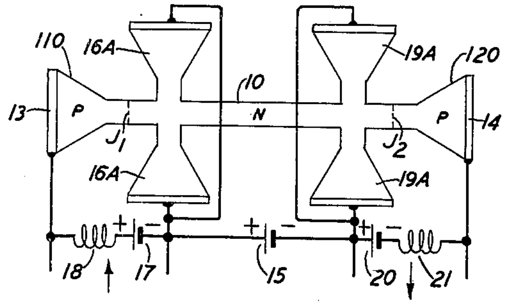
Fig. 12 illustrates a modification of the device shown in Fig. 10 wherein the semiconductive body comprises several zones of different conductivity types.

The delay or storage device illustrated in Fig. 12 is basically similar to that shown in Fig. 10 and described hereinabove. However, in this embodiment, the end portions 110 and 120 of the semiconductive body are of conductivity type opposite that of the body portion 10 and the emitters 16A and collectors 19A are integral extensions or wings on the body portion 10 and of the same conductivity type as this portion. The conductivity types of the several portions in a typical structure are indicated in Fig. 12. The junctions between the N and P type portions are indicated at $J_1$ and $J_2$. Signals may be delayed or stored as in the device illustrated in Fig. 10.

As pointed out heretofore, the output signal includes two components which may be designated as direct and delayed. In cases where highly faithful replicas of the input signal are desired or where the attenuation of the delayed component is so large that it can be detected only with difficulty at best, the direct component may be suppressed or eliminated in the load circuit. Ways of effecting the result are illustrated in Figs. 13, 13A, 13B and 14.

Figure 13A:
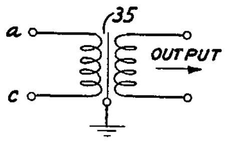
Figs. 13, 13A, 13B and 14 are diagrams showing several circuits illustrative of typical embodiments of this invention, for high fidelity reproduction of input signals.
Figure 13:
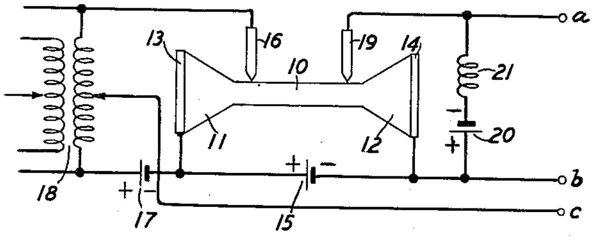

In Fig. 13, the body 10, 11, 12 is of the form and construction described heretofore in connection with Figs. 2 and 10 and the collector circuit, like that in Figs. 1 and 10, includes the source 20 and impedance 21. The input circuit includes the input transformer 18 with its secondary connected between the emitter 16 and the terminal 13, and tapped at an intermediate point. The device is provided with three output terminals $a$, $b$ and $c$. A fraction of the input signal is fed directly to the output circuit and combined with the output of the translating device, i. e. the collector circuit output, in such relation that it substantially cancels the direct component in the collector circuit output.

Figure 13B:
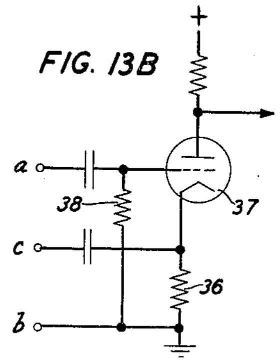

This may be accomplished, as illustrated in Fig. 13A, by the use of an isolating transformer 35 connected as shown across the terminals $a$ and $c$. The voltage at $c$ is adjusted by tapping the secondary of transformer 18 at the proper point to be that fraction of the input signal which best compensates for the direct signal. It may be accomplished also, as illustrated in Fig. 13B, by applying the fraction of the input signal across the cathode resistor 36 of a vacuum tube amplifier 37, the output of the translating device being applied through the grid resistor 38.

Figure 14:
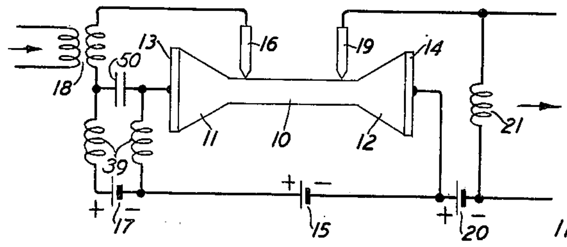

In the system illustrated in Fig. 14, choke coils 39, having a blocking condenser 50 associated therewith, are connected between the emitter 16 and terminal 13 as shown and function to maintain the current in the semiconductive body 10, 11, 12 substantially constant. Hence, since the total alternating current is zero, there is no direct transmission of the input signal to the collector 19 and, therefore, no direct component in the output circuit.

It will be understood that any of the constructions illustrated in Figs. 2 to 5 inclusive may be utilized for delay or storage devices by making the spacing between the emitter and collector sufficiently great to produce the requisite or desired transit time.

A construction, which may be used as a delay or storage device or as an amplifier, particularly advantageous from the standpoint of uniformity of the longitudinal field is illustrated in Figs. 6 and 6A, the former being a side view and the latter an end view. In this construction, the semiconductive body 10 is a circular filament, for example of the order of 0.02 inch in diameter, with ohmic low resistance terminals 130 and 140 in the form of annular coatings on the ends thereof. The emitter and collector points 16 and 19 respectively are aligned, and coaxial with the body 10 and the terminals 130 and 140. When intended for use as a delay or storage device, in this construction the body 10 may be relatively long, its length and the longitudinal biasing field being correlated in the manner described heretofore. In the case of an amplifier, the body 10 may be a disc to provide a small separation of the order of magnitude heretofore indicated between the emitter and collector.

In another embodiment of the invention, illustrated in Fig. 7, the negative terminal of the biasing source 15 is connected to the collector point 19 through a high impedance 25. The latter maintains the current substantially constant. However, when holes arrive at the collector 19, a large change results in the impedance between the collector and the semiconductive body with a consequent and corresponding change in the voltage of the collector. The collector to emitter spacing and the biasing voltage may be correlated in the manner described heretofore to produce a desired delay. Also, it will be appreciated that the device in Fig. 7 may be utilized as a direct current amplifier.

In the embodiment of the invention illustrated in Fig. 8, the semiconductive body comprises two portions 10A and 10B of different conductivity types, for example of N and P type as indicated in the figure. A choke coil 25 is provided in series with the biasing source 15 and serves to maintain the total current through the body substantially constant. The output circuit is connected between two terminals 26 and 27 making nonrectifying contact with the portions 10A and 10B respectively, and may include a transformer 28. The holes injected at the emitter 16, under the influence of the field due to the source 15 flow toward the terminal 14 and pass easily across the junction J between the two semiconductive portions 10A and 10B. Inasmuch as the total current in the body is maintained substantially constant, a voltage drop corresponding to the input signal appears across the junction J and hence between the terminals 26 and 27.

In the modification of the device of Fig. 8 illustrated in Fig. 9, the output circuit is connected between the terminal 14 and an integral wing or extension 260 on the body portion 10A, the wing or extension being of the same conductivity type material as the portion 10A.

The devices illustrated in Figs. 8 and 9 may be employed to delay or store electrical signals or as direct current amplifiers.

Although the invention has been described with reference to particular applications as amplifiers or to delay or store signals, it will be appreciated that it may be utilized to attain amplification concomitantly with delay. The desired operating characteristics in any particular case can be obtained by correlation of the significant parameters in accordance with the principles set forth hereinabove.

Furthermore, in the embodiments of the invention described, the biasing field due to the source 15 has been considered as of constant magnitude. The hole transit time can be varied, and the delay between input and output signals likewise varied, by varying the biasing field. For example, phase modulation may be realized by cyclically altering the potential between the terminals 13 and 14, as by an alternating current source connected between the source 15 and one of the terminals 13 or 14 or by replacing the direct current source 15 with an alternating current source.

Finally, it will be understood that the several embodiments of the invention are but illustrative and that various modifications may be made therein without departing from the scope and spirit of this invention.

What is claimed is:

1. A signal translating device comprising a body of semiconductive material, a base connection to said body, a first circuit including said connection and means for injecting electric charges of the polarity not normally present therein into said body at one region thereof, a second circuit including a collector connection to said body at a region thereof spaced from said one region, means for biasing said collector connection at a polarity opposite that of said charges, and means separate from said collector connection for controlling the transit time of said charges from said one region to said collector connection.

2. A signal translating device comprising a semiconductive body having an elongated portion, a base connection to said body, an input circuit connected to said base connection and including means for injecting electric charges of one polarity into said body adjacent one end of said portion, an output circuit connected to said body adjacent the other end of said portion, and means separate from said output circuit for establishing betwen the ends of said portion a biasing potential of the polarity to accelerate flow of said charges toward said other end of said portion.

3. A signal translating device comprising a semiconductive body, an input circuit including a rectifying connection to said body at one region thereof, an output circuit including a connection to said body at a second region thereof, and means including a pair of connections to said body and a source separate from said input and output circuits connected therebetween for producing in said body and between said one and second regions an electric field of polarity to accelerate charges introduced at said rectifying connection toward said second region.

4. A signal translating device comprising a body of semiconductive material, an input circuit including a rectifying connection to one region of said body, an output circuit including a rectifying connection to a second region of said body, and means independent of said output circuit for controlling the transit time of electrical charges through said body between said regions comprising a biasing source having its poles connected to said body adjacent said one and second regions respectively.

5. A signal translating device comprising a body of semiconductive material, ohmic connections to two spaced regions of said body, a pair of rectifying connections to two spaced regions of said body intermediate said first regions, an input circuit connected between one of said rectifying connections and the ohmic connection nearest thereto, an output circuit between the other of said ohmic and rectifying connections, and a biasing source connected between said ohmic connections.

6. A signal translating device comprising a body of semiconductive material, ohmic connection to two spaced regions of said body, means connected between said connections for establishing an electrical field between said spaced regions, a pair of rectifying connections to said body each adjacent a respective one of said ohmic connections, an input circuit between one rectifying connection and the ohmic connection thereadjacent, and an output circuit connected between the other of said ohmic and rectifying connections.

7. A signal translating device comprising a thin elongated body of semiconductive material, ohmic terminals on opposite ends of said body, and a pair of rectifying connections to intermediate regions of said body spaced in the direction of the length of said body.

8. A signal translating device comprising a body of semiconductive material having a filamentary portion, a pair of ohmic terminal connections to said body adjacent the ends of said filamentary portion, and a pair of rectifying connections to said portion each adjacent a respective end thereof.

9. A signal translating device comprising a cylindrical filament of semiconductive material, substantially aligned rectifying connections to the opposite end faces of said filament, and annular ohmic connections to opposite ends of said filament and each substantially coaxial with the respective rectifying connections.

10. A signal translating device comprising a filament of semiconductive material, substantially coaxial rectifying and ohmic connections to one end face of said filament, and a rectifying connection to the other end of said filament.

11. A signal translating device comprising a body of semiconductive material having a filamentary portion, ohmic terminal connections to opposite ends of said body, said filamentary portion extending between said ends and being of one conductivity type material, and a pair of rectifying connections to spaced regions of said filamentary portion, one of said connections including a lateral extension on said portion and of the conductivity type opposite thereto.

12. A signal translating device comprising a body of semiconductive material having two contiguous portions of different conductivity types, an output circuit connected between said two contiguous portions adjacent opposite sides of the junction thereof, means for injecting electric charges into one of said portions at a region spaced from said junction, and means separate from said output circuit for accelerating said charges toward said junction.

13. A signal translating device comprising a body of semiconductive material having two contiguous portions, one of N type and the other of P type material, means for biasing said one portion positive with respect to said other portion, an input circuit including a rectifying connection to said one portion, and an output circuit separate from said biasing means and connected between said two portions on opposite sides of and adjacent the junction between said two portions.

14. A signal translating device comprising a body of N type semiconductive material, a pair of ohmic connections to spaced regions of said body, a pair of contacts making rectifying junction with spaced regions of said body intermediate said ohmic connections, an input circuit connected between one of said contacts and the ohmic connection nearest thereto and including a source for biasing said one contact positive relative to the ohmic connection nearest thereto, an output circuit connected between the other of said contacts and ohmic connections and including a source for biasing said other contact negative relative to said other ohmic connection, and a direct-current biasing source connected between said ohmic connections and having its negative terminal connected to said other ohmic connection.

15. A signal translating device comprising a body of semiconductive material of one conductivity type, an emitter engaging said body adjacent one end thereof, a collector engaging said body adjacent the other end thereof, an input circuit including a biasing source connected to said emitter, an output circuit including a biasing source connected to said collector, and means for producing in said body a biasing field of polarity to accelerate electric charges introduced at said emitter, toward said collector, said means including connections to opposite ends of said body and a biasing source connected between said connections.

16. A signal translating device comprising a body of semiconductive material, an ohmic connection to said body at one end thereof, an emitter engaging said body adjacent said one end and defining a rectifying junction therewith, a collector engaging said body at the other end thereof and defining a rectifying junction therewith, a biasing source and a choke coil connected in series between said ohmic connection and said collector, and input and output circuits connected to said emitter and collector respectively.

17. A signal translating device comprising a body of N type germanium having an elongated portion of restricted cross section, an emitter connection to said body adjacent one end of said portion, a collector connection to said body adjacent the other end of said portion, a direct-current biasing source having its terminals connected to said body adjacent the ends of said portion, the positive terminal of said source being connected to said body adjacent said one end, and means in circuit with said source for maintaining the current through said body substantially constant.

18. A signal translating device comprising a body of semiconductive material having end portions of one conductivity type and an intermediate thin portion of the opposite conductivity type, a first pair of opposed, aligned extensions on said intermediate portion adjacent the junction between said intermediate portion and one of said end portions, and a second pair of opposed, aligned extensions on said intermediate portion adjacent the junction of said intermediate portion and the other of said end portions.

19. A signal translating device comprising a body of semiconductive material having end portions of P type material and an intermediate portion of N type material, ohmic terminal connections to said end portions, a first pair of opposed, aligned extensions on said intermediate portion adjacent the junction between said intermediate portion and one of said end portions, and a second pair of opposed, aligned extensions on said intermediate portion adjacent the junction between said intermediate portion and the other of said end portions.

20. A signal translating device comprising a body of semiconductive material, an emitter connection to one region of said body, a collector connection to a second region of said body, means for establishing in said body a biasing field of polarity to accelerate charges injected at said emitter, toward said second region, an input circuit connected to said emitter connection, an output circuit connected to said collector connection, and means for combining a portion of the signals impressed upon said input circuit with the signals in said output circuit and in opposing relation thereto.

21. A signal translating device comprising a body of semiconductive material, an input circuit including an emitter connected to said body at one region thereof, an output circuit including a collector connection to said body at a second region thereof, a direct-current source connected to said body for producing therein a biasing field between said one and second regions, and means including a connection between said input and output circuits for reducing the output component due to said biasing field.

22. A signal translating device comprising an elongated body of semiconductive material, an output circuit connected to a first region of said body, an input circuit including means for injecting charges into said body at a second region thereof spaced from said first region, and means in addition to said input and output circuits for establishing between said first and second regions a field of polarity to accelerate said charges from said second region to said first region, the spacing between said regions being sufficiently large so that the transit time of said charges from said second to said first region is at least several times the length of the signals in said input circuit.

23. A signal translating device comprising an elongated body of N type semiconductive material, an output circuit including a collector connection to said body adjacent one end thereof, an input circuit including an emitter connection to said body adjacent the other end thereof, and a biasing source connected between the ends of said body, the positive terminal of said source being connected to said other end, the spacing between said emitter and collector connections being at least several times the hole diffusion length for signal pulses of prescribed length impressed upon said input circuit.

24. A signal translating device comprising an elongated body of N type semiconductive material, an output circuit including a collector connection to one region of said body, means for impressing signal pulses upon said body including an emitter connection to said body at a second region spaced from said one region, and means separate from said output circuit for establishing in said body and between said regions a biasing field of the polarity to accelerate positive charges from said second region toward said one region, the spacing between said one and second regions being such that the hole transit time therebetween is a plurality of times the length of the signal pulses impressed upon said body.

25. A signal translating device comprising a body of semiconductive material, means including a low impedance rectifying connection to said body for injecting electric charges of one polarity into said body at one region thereof, an output circuit including a high impedance connection to said body at a second region spaced from said one region, and means comprising connections to said body beyond opposite ends of the path between said regions for establishing in said body an electric field of the polarity to accelerate said charges from said one region toward said second region.

JAMES R. HAYNES.
WILLIAM SHOCKLEY.

REFERENCES CITED

The following references are of record in the file of this patent:

UNITED STATES PATENTS

| Number | Name | Date |
|---|---|---|
| 1,745,175 | Lilienfeld | Jan. 28, 1930 |
| 2,517,960 | Barney | Aug. 8, 1950 |
| 2,524,033 | Bardeen | Oct. 3, 1950 |
| 2,524,035 | Bardeen | Oct. 3, 1950 |